C. E. CURTISS.
CULTIVATOR BLADE.
APPLICATION FILED FEB. 9, 1920.

1,438,583.

Patented Dec. 12, 1922.

INVENTOR.
Charles E. Curtiss
BY

ATTORNEYS.

Patented Dec. 12, 1922.

1,438,583

UNITED STATES PATENT OFFICE.

CHARLES E. CURTISS, OF CLINTON, WISCONSIN.

CULTIVATOR BLADE.

Application filed February 9, 1920. Serial No. 357,437.

*To all whom it may concern:*

Be it known that I, CHARLES E. CURTISS, a citizen of the United States, residing at Clinton, in the county of Rock and State of Wisconsin, have invented a new and useful Cultivator Blade, of which the following is a specification.

I hereby declare the following to be a full, clear and exact description of the invention, such as will enable others skilled in the art to which it appertains to make and use the same.

This invention relates to cultivator blades and their mountings.

The prime object of this invention is to provide a pair of cultivator blades, right and left, which will handle the soil, in all conditions, in a more satisfactory manner than is possible with the cultivator blades now in use.

A second object is to embody in a blade, a form, which, under varied positions will at once satisfy advocates of either deep or surface cultivation or any practice between these two extremes.

A third object is to provide a pair of blades, and means for delicate adjustment thereof, by the use of which the soil may be loosened at a safe distance from the plant and a portion of the fine soil, so loosened, moved transversely and be deposited very close to the young plants without injury to them, also a pair of blades which are equally efficient where large amounts of earth are to be moved toward the more mature plants, as in hilling or ridging.

The invention has other objects which will appear from the following specification:

In describing the invention in detail reference will be had to the accompanying drawings, wherein like numerals designate like parts throughout the several views.

Figure 1:
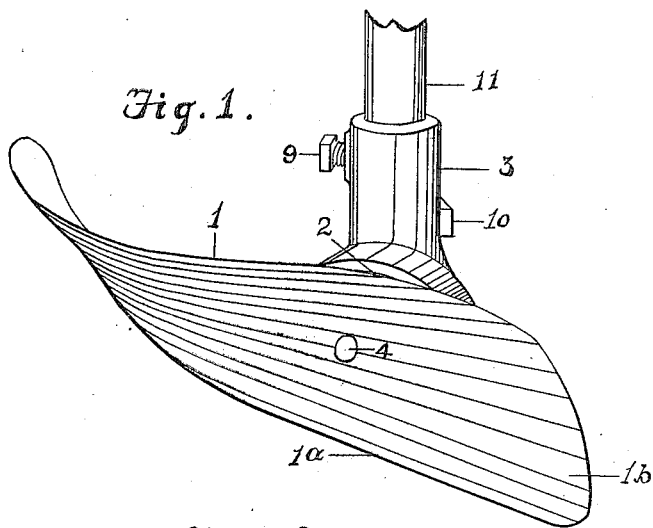
Fig. 1 is a perspective view of the blade and its mountings.

In Fig. 1 is shown the blade, 1; the blade support, 2; the carrier, 3; a portion of a cultivator shank, 11; set screws, 9 and 10; and the fastening bolt, 4.

Figure 2:
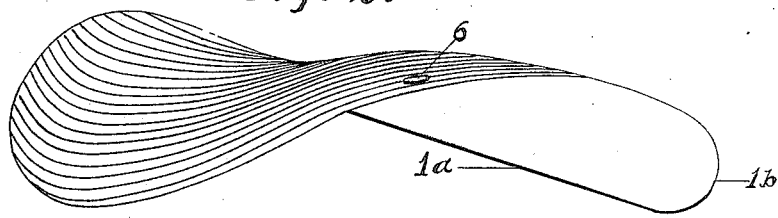
Fig. 2 is a horizontal projection of a left hand blade having the straight, or shearing edge, in the plane of projection, the top edge of the blade, at the front end, being inclined backward from the vertical, 30 degrees.
Figure 3:
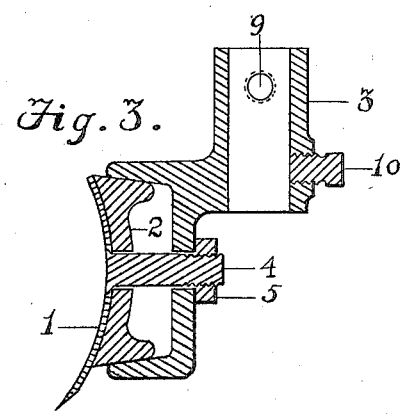
Fig. 3 is a sectional view of the blade, the blade support, the carrier, the fastening bolt and nut, and one set screw in assembled position, cut by a vertical plane through the longitudinal center line of the fastening bolt.

The blade, 1, is pivoted upon the bolt, 4, which passes through hole, 6, Fig. 2, and may be revolved completely around this bolt as a center and secured at any point in the revolution; practically only about 90 degrees of the arc is used in adjusting the blade about this axis; for example: the lower straight edge, 1ª, called the share, may be operated parallel to the ground surface or it may be raised to a vertical position in which case the blade will run on the point, 1ᵇ, and act as an ordinary cultivator tooth.

This wide and delicate adjustment about a horizontal axis, insures a similar wide range in results in tillage, under the varying conditions of soil and plants.

The adjustment about the vertical axis is equally provided for, the carrier, 3, is adapted to receive a cylindrical cultivator shank, 11, and is provided with an upper set screw, 9, and a lower set screw, 10 the carrier may be raised or lowered upon the cultivator shank or it may be faced in any direction by revolution about the shank, when in proper adjustment the set screws hold it in place.

The blade support, 2, forms the connection between the blade, 1, and the carrier, 3; it conforms on its front face, to the convex back of the blade and moves with it, and at the rear has the form of a truncated cone which is adapted to enter, in intimate frictional contact, a conical cavity in the lower front portion of the carrier, 3; these three members have registering apertures to receive the fastening bolt, 4, and are secured, in any position of adjustment, by means of nut, 5.

The blades are made from the same blank but the curves are reversed in fabrication, resulting in blades right and left.

The length of the blank is about three times its width, the two longer sides are parallel and the ends are intersecting arcs of circles of different radii, the ends have the same form but are reversed, that is to say, the long points are diagonally opposite, the approximate form of the end is shown in perspective Fig. 1.

The blade is of peculiar form being made up of a combination of curved surfaces; the lower forward portion, called the share, is substantially straight and sharp for a distance: the latter part, however, being dulled and curved upward and meeting the adjoining circular end curve, the function of the share is to shave the ground and thereby produce fine dirt instead of lumps.

The top edge of the blade at the front end, in normal working adjustment, is positioned upward and backward from the share; from this point the top edge curves, longitudinally of the blade, forward, passing over and beyond the share and finally terminating in a reverse curve of comparatively short radius and joins the circular end curve.

This position of the two edges results in a varied curved surface joining them; at the point of the blade the front face is flat but immediately becomes concave and increases in concavity toward and beyond the center then merges into and terminates in an upward inclined convex exposure.

The action of this form of blade is most varied, considering the range of vertical and horizontal adjustments to which it is subject.

An especially valuable feature may be mentioned; the soil may be loosened at a distance from the plant roots and run over the point of the blade and dropped into place, nearer the plant the ground is shaved, or fine dirt produced, and due to the angle of the blade with the line of motion this fine soil is moved, transversely, up to the plant in a low, thin stream. This covers the small weeds among the plants and does not cover the plants because there are no large lumps thrown upward and sidewise to fall upon the plants as with an ordinary cultivator tooth. No fender or shield is required when plants are small as the fine dirt can be rolled into the plant row and smoothed by the convex rear end of the blade. From this delicate work with young plants, by means of the various adjustments, the blade may be set to do any degree of cultivation up to and including hilling and ridging.

Having explained the invention in detail I now proceed to include the novel features in the following claims:—

1. An elongated, non-reversible cultivator blade apertured at a pivotal point and terminating forwardly in a point, said blade having a sharp edge for a distance above said point and a sharp lower edge contiguous to said point, said lower edge becoming dulled rearwardly and rising to meet the upper edge of said blade, said blade having a longitudinal convex rear surface for a portion of its length and terminating inwardly in a convex front exposure.

2. An elongated, non-reversible cultivator blade apertured at a pivotal point and terminating forwardly in a point, said blade having a sharp edge for a distance above said point and a sharp lower edge contiguous said point, said lower edge becoming dulled rearwardly and rising to meet the upper edge of said blade, said blade having a longitudinal convex rear surface for a portion of its length and terminating inwardly in a convex front exposure, an apertured blade support conforming to the convex rear surface of said blade, a carrier adapted, by means of an aperture, to receive a cultivator tooth shank at its upper extremity and to coact with the rear portion of said blade support at its lower extremity and means for separably and adjustably connecting the aforesaid three members together.

3. A cultivator blade comprising an elongated blade having a digging point and a sharp, substantially straight shearing edge contiguous thereto, said edge being dulled rearwardly and finally rising and joining the rear end curve of said blade, the upper edge of said blade being positioned, at the front end, above and backward of said shearing edge and curving forward over and beyond the share and finally rising and terminating in a reverse curve; a blade-support positioned on, and conforming to, the convex back of said blade the posterior portion of said blade-support having the form of a truncated cone, a carrier provided at its upper extremity with an opening to receive the shank of a cultivator, means for securing said carrier to said cultivator shank in different positions of adjustment, said carrier having at its lower portion a conical cavity to receive the conical terminal of the said blade-support in frictional contact and means to secure the aforesaid parts together in operative position, substantially as described.

4. A cultivator blade comprising an elongated blade having a length approximately three times its width and having its ends similarly rounded, one end sharpened and the contiguous lower edge sharpened for a distance, the same being dulled rearwardly, and rising and joining the rear end curve of the blade, the upper edge curving forwardly, from the point of the blade, over and beyond the lower edge, rising and joining the rear end curves of the blade; a blade-support, conforming to the rear convex surface of the blade and having a tapered posterior portion and a central aperture; a carrier, apertured at its upper extremity to receive the shank of a cultivator and apertured in its lower rear wall to receive a clamping bolt, the lower front portion of said carrier having a cone shaped cavity to receive, in frictional contact, the above mentioned tapered, posterior portion of said blade-support, means for securing said carrier, in adjustable position, upon the shank of a cultivator and means for holding the aforesaid three members together in operative position, substantially as set forth.

5. A pair of elongated, non-reversible, apertured cultivator blades, right and left, each having a sharp working end and a lower cutting edge contiguous thereto said cutting edges being dulled rearwardly and rising to meet the upper edges of said blades, each of said blades having a longitudinal convex rear surface for a portion of its length, said convex surface merging, inwardly, into and terminating in a convex front exposure, each of said blades having an apertured blade support conforming to the rear convex surface of said blades and positioned longitudinally with respect to the apertures of said blades, a pair of carriers adapted, by means of apertures, to receive the shanks of an ordinary cultivator, at their upper extremities and adapted to co-act with said blade supports at their lower extremities and means, adjustably, to connect the aforesaid members together.

6. The combination of an elongated cultivator blade having a convex rear surface and an aperture at a pivotal point, a blade-support conforming to said convex back of and moving with said blade, the posterior portion of said blade-support being in the form of a truncated cone having a central aperture, a carrier having a conical cavity to receive said posterior portion of said blade-support in frictional contact and an aperture through the rear wall of said conical cavity, a bolt and nut to force said blade-support and carrier into frictional contact said bolt being also serving as a pivot about which said blade is adjusted, and as a means for securing aforesaid three members in operative position, substantially as set forth.

In testimony whereof I hereunto affix my signature in the presence of two witnesses.

CHARLES E. CURTISS.

Witnesses:
F. W. HERRON,
W. H. CHEESMAN.